US006878924B2

(12) United States Patent
Baron

(10) Patent No.: US 6,878,924 B2
(45) Date of Patent: Apr. 12, 2005

(54) DATACONFERENCING SYSTEM AND METHOD

(75) Inventor: John M. Baron, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 10/162,150

(22) Filed: Jun. 4, 2002

(65) Prior Publication Data

US 2003/0226950 A1 Dec. 11, 2003

(51) Int. Cl.[7] ............................ G06M 7/00; H01J 40/14
(52) U.S. Cl. ..................... 250/221; 348/14.08; 348/370
(58) Field of Search ................. 250/205, 208.1, 250/211, 221; 348/14.08, 366, 370; 358/475, 479

(56) References Cited

U.S. PATENT DOCUMENTS

| | | | |
|---|---|---|---|
| 4,772,910 A | * | 9/1988 | Fields ........................ 396/106 |
| 5,278,674 A | * | 1/1994 | Webb et al. ................ 358/475 |
| 5,489,938 A | | 2/1996 | Maruyama et al. |
| 5,969,829 A | * | 10/1999 | Matsuda et al. ............ 358/475 |
| 5,990,931 A | * | 11/1999 | Nimri et al. ............ 348/14.08 |
| 6,239,835 B1 | | 5/2001 | Hori |
| 6,345,763 B1 | * | 2/2002 | Matsuda et al. ............ 235/459 |
| 6,744,469 B1 | * | 6/2004 | Gudenburr et al. ......... 348/370 |
| 2002/0130950 A1 | * | 9/2002 | James et al. ............. 348/14.08 |

FOREIGN PATENT DOCUMENTS

JP    5219269    8/1993

* cited by examiner

Primary Examiner—David Porta
Assistant Examiner—Davienne Monbleau

(57) ABSTRACT

A dataconferencing system comprises an imaging device adapted to generate an image of a document. The system also comprises a light source adapted to generate light proximate to the document for generating the image. A monitor application accessible by a processor is adapted to detect a change corresponding to the document. A lighting application accessible by the processor is adapted to automatically activate the light source in response to the detected change.

46 Claims, 4 Drawing Sheets

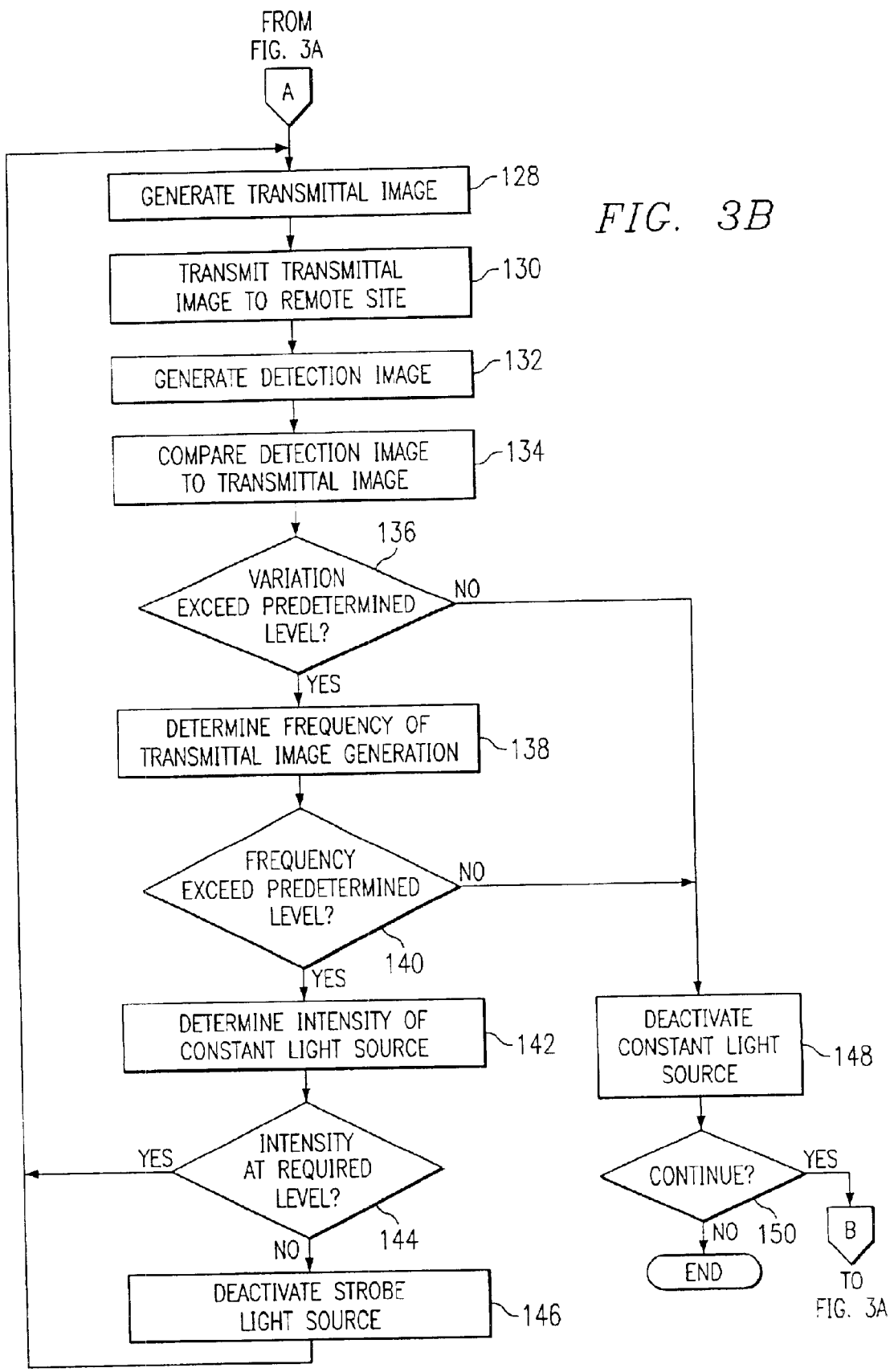

DATACONFERENCING SYSTEM AND METHOD

TECHNICAL FIELD OF THE INVENTION

The present invention relates generally to the field of data communications and, more particularly, to a dataconferencing system and method.

BACKGROUND OF THE INVENTION

Remote sites may be connected using the Internet, an intranet, or over standard telephone lines to accommodate conferencing between the sites. For example, each site may include a microphone, speakerphone, or other device for transmitting audio signals between the sites, a camera for generating and transmitting video signals between the sites, and perhaps a whiteboard for sharing written data between the sites. Each site may also include an overhead projector for remotely viewing documents.

Present dataconferencing systems, however, suffer several disadvantages. For example, in the case of document viewing, inadequate lighting may cause shadowing on portions of the document, thereby resulting in poor image quality and difficulty in viewing the document by the remote site. Additional lighting may be used to increase the light intensity directed toward the document. However, the additional lighting often generates excessive amounts of heat, consumes additional power, and creates glare. Further, present dataconferencing systems may also be limited to providing intermittent snapshots of transparency slides. Thus, present systems may be incapable of providing real-time remote image viewing which may be desirable for classroom teaching or other applications.

SUMMARY OF THE INVENTION

In accordance with one embodiment of the present invention, a dataconferencing system comprises an imaging device adapted to generate an image of a document. The system also comprises a light source adapted to generate light proximate to the document for generating the image. A monitor application accessible by a processor is adapted to detect a change corresponding to the document. A lighting application accessible by the processor is adapted to automatically activate the light source in response to the detected change.

In accordance with another embodiment of the present invention, a dataconferencing method comprises receiving a document. The method also comprises detecting a change to the document and automatically activating a light source to generate proximate to the document in response to the detected change. The method further comprises generating an image of the document using the generated light.

BRIEF DESCRIPTION OF THE DRAWINGS

For a more complete understanding of the present invention and the advantages thereof, reference is now made to the following descriptions taken in connection with the accompanying drawings in which:

FIGS. 3A and 3B are a flow chart illustrating a method for dataconferencing in accordance with an embodiment of the present invention.

DETAILED DESCRIPTION OF THE DRAWINGS

Figure 1:
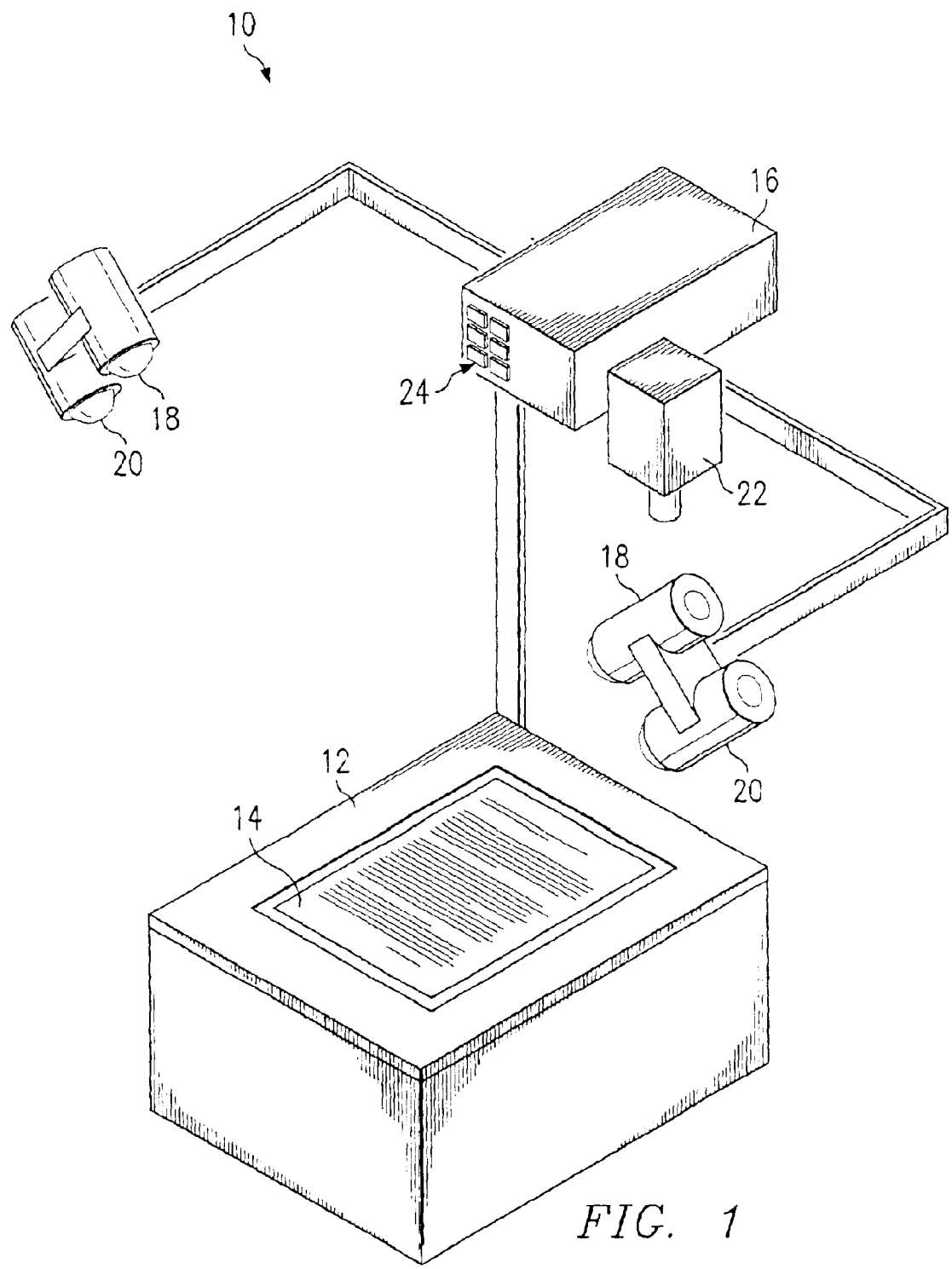
FIG. 1 is a perspective diagram illustrating an embodiment of a dataconferencing system in accordance with the present invention.
Figure 2:
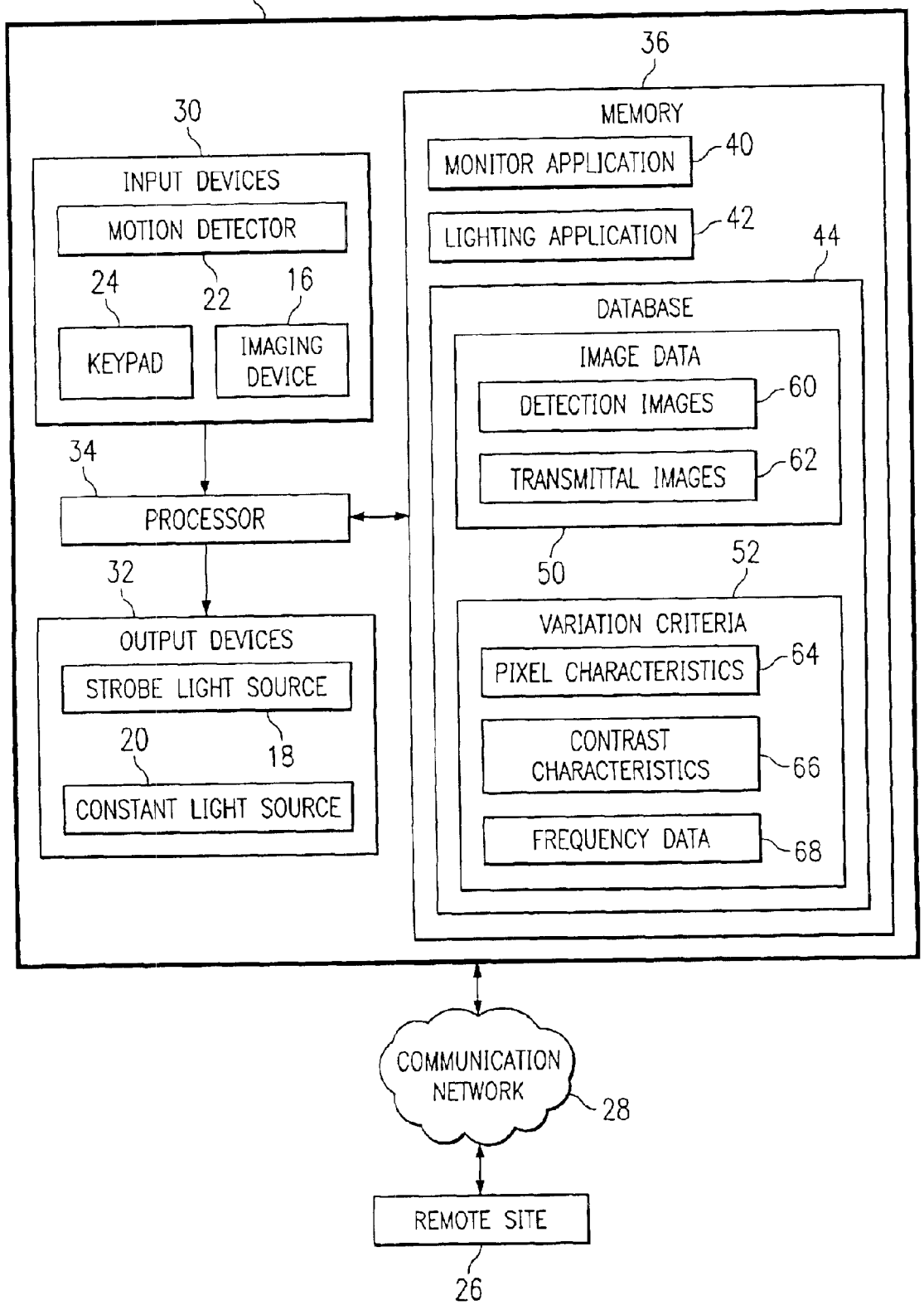
FIG. 2 is a block diagram illustrating an embodiment of a dataconferencing system in accordance with the present invention.

The preferred embodiments of the present invention and the advantages thereof are best understood by referring to FIGS. 1–3 of the drawings, like numerals being used for like and corresponding parts of the various drawings.

FIG. 1 is a perspective diagram illustrating an embodiment of a dataconferencing system 10 in accordance with the present invention. Briefly, system 10 provides high resolution images of documents for dataconferencing with remote sites. For example, in one embodiment, a combination of a strobe light source and a constant light source are used to accommodate various lighting requirements for producing a high resolution image of a document. The strobe light source is automatically and intermittently triggered in response to changes to the document or changes in the vicinity of the document to provide a desired intensity of light directed toward the document for high resolution image generation corresponding to the document. As the frequency of changes to the document or in the vicinity of the document increases, the constant light source may be activated to provide a generally constant light directed toward the document for continued image gathering corresponding to the document.

Referring to FIG. 1, system 10 comprises a display 12 for providing a mounting or display surface for a document 14 to be dataconferenced with a remote site. Document 14 may comprise an opaque, translucent, or transparent document. System 10 also comprises an imaging device 16 for generating an image of document 14. Imaging device 16 may comprise an analog or digital camera or other device for generating an image of document 14 now known or later developed.

In the illustrated embodiment, system 10 also comprises one or more strobe light sources 18 and one or more constant light sources 20. Strobe light source(s) 18 are adapted to provide intermittent lighting directed toward document 14 when generating an image of document 14 using imaging device 16. Constant light source(s) 20 are used to provide a generally constant source of light directed toward document 14 when generating an image using imaging device 16. Thus, while strobe light source(s) 18 provide intermittent bursts of light energy upon activation, constant light source (s) 20 are generally always on or activated, thereby generating a substantially constant source of light energy. Additionally, as will be described in greater detail below, constant light source(s) 20 may also be configured to provide varying intensities of constant light. In the illustrated embodiment, light sources 18, 20 are disposed at approximately a sixty degree angle relative to document 14 such that light generated by light sources 18, 20 reflect from document 14 to imaging device 16. However, other angular orientations and/or positions of light sources 18, 20 may be used relative to document 14 and imaging device 16.

In operation, imaging device 16 generates a series of images of document 14 to determine whether changes to document 14 require generation of a high resolution image of document 14 for transmittal to a remote site. As used herein, a low resolution image may comprise an image having limited clarity, definition, or other characteristics, and a high resolution image comprises an image having greater clarity, definition, or other characteristics than a low resolution image. Thus, high resolution images may be desired for transmittal to a remote site for viewing while low resolution images may be sufficient to detect changes to document 14 or for other purposes. The series of images for change detection may be generated using ambient light or light generated by constant light source(s) 20. For example, if ambient light is insufficient to generate an image of document 14 of sufficient resolution to detect changes to document 14, constant light source(s) 20 may be activated at a generally low intensity level to provide the desired level of resolution. The series of images generated of document 14 are evaluated to detect changes corresponding to document 14. If a change occurs to document 14, strobe light source(s) 18 may be activated to produce a generally short and high intensity light burst directed toward document 14 for generating a high resolution image of document 14 using imaging device 16. The high resolution image of document 14 may then be transmitted to a remote site. If a frequency of changes to document 14 increases, constant light source (s) 20 may be activated, or the intensity increased, to provide a generally constant source of light directed toward document 14 such that imaging device 16 generates a series of high resolution images for transmittal to the remote site. After the frequency of changes to document 14 decreases, constant light source(s) 20 may be deactivated or the intensity level decreased.

System 10 may also comprise a motion detector 22 for detecting motion proximate to document 14. In operation, in response to motion detected proximate to document 14, strobe light sources 18 may be activated to direct light toward document 14 for generating a high resolution image of document 14 using imaging device 16. As described above, as a frequency of motion proximate to document 14 increases, constant light sources 20 may also be activated to generate a generally constant source of light directed toward document 14 for generating a series of high resolution images of document 14. After generation, the high resolution image(s) may then be transmitted to the remote site.

As described above, system 10 may be adapted to operate substantially automatically for creation of high resolution images of document 14 in response to changes to document 14 or motion proximate to document 14. System 10 may also be configured to accommodate manual intervention by a user of system 10. For example, imaging device 16 may comprise one or more keypads 24 for activation by the user. In operation, in response to activation of one of keypads 24, strobe light source 18 may be activated to generate a flash of light directed toward document 14 for generating a high resolution image of document 14 using imaging device 16. As described above, the high resolution image may then be transmitted to a remote site. Keypads 24 may also be used to activate constant light source 20 in anticipation of continued changes to document 14 such that a generally constant source of light is directed toward document 14 for generation of a substantially continuous series of high resolution images to be transmitted to the remote site.

FIG. 2 is a block diagram illustrating an embodiment of system 10 in accordance with the present invention. System 10 generates images corresponding to document 14 to accommodate dataconferencing with a remote site 26. The images may be transmitted via a communication network 28, such as the Internet, an intranet, or other wired or wireless communication mediums now known or later developed. System 10 preferably comprises input devices 30, output devices 32, a processor 34, and a memory 36. In this embodiment, input devices 30 comprise imaging device 16, motion detector 22, and keypad 24. Input devices 30 may also include other devices such as a keyboard, pointing device, such as a mouse or a track pad, a scanner, or other type of device for inputting information into system 10 now known or later developed. In the illustrated embodiment, output devices 32 comprise strobe light source(s) 18 and constant light source(s) 20. However, output devices 32 may also comprise a monitor, display, printer, communication network 28 port, or other type of device or outlet for generating an output now known or later developed. Components of system 10 may be located in relatively close proximity to each other or located remote from each other. For example, processor 34 and/or memory 36 may be located remote from imaging device 12 or other components of system 10, such as in another room, building, or city, and coupled to device 12 and other components of system 10 using wired or wireless communication networks.

The present invention also encompasses computer software that may be executed by processor 34. In the illustrated embodiment, memory 36 comprises a monitor application 40 and a lighting application 42, which in this embodiment are computer software programs. However, it should be understood that system 10 may be configured having software, hardware, and/or a combination of software and hardware components. In FIG. 2, monitor application 40 and lighting application 42 are illustrated as stored in memory 36, where they may be executed by processor 34. However, applications 40, 42 may be otherwise stored such that applications 40, 42 are accessible by processor 34. Briefly, monitor application 40 monitors changes to document 14 or changes proximate to document 14. In response to a detected change by monitor application 40, lighting application 42 controls activation of strobe light source(s) 18 and/or constant light source(s) 20 for generation of high resolution images of document 14.

In the illustrated embodiment, system 10 also comprises a database 40 stored in memory 36. Database 40 comprises information associated with images generated by imaging device 16. For example, in the illustrated embodiment, database 44 comprises image data 50 and variation criteria 52. Briefly, image data 50 comprises information associated with the images generated by imaging device 16, which may comprise low resolution images used to determine changes corresponding to document 14 or high resolution images for transmittal to a remote site. Variation criteria 52 comprise one or more criterion or information associated with detecting changes to document 14 or changes proximate to document 14.

As described above, image data 50 comprise information associated with images generated by imaging device 16. In the illustrated embodiment, image data 50 comprise detection images 60 and transmittal images 62. Detection images 60 comprise low resolution image information generated by imaging device 16 for determining whether a change to document 14 requires generation of a high resolution image. Detection images 60 may be generated by imaging device 16 using ambient light or using light generated by constant light source 20. For example, as described above, constant light source 20 may be adapted to generate a desired intensity of light to produce an image of sufficient resolution to enable detection of changes to document 14 while generating a minimum amount of thermal energy and consuming minimal power. Detection images 60 represent low resolution images of document 14 that may be compared to variation criteria 52 to determine whether a change to document 14 has occurred which may require generation of a high resolution image of document 14 for transmittal to remote site 26. Transmittal images 62 comprise the high resolution image information corresponding to document 14 for transmittal to remote site 26.

Variation criteria 52 comprise information associated with evaluating detection images 60 to determine whether a sufficient change to document 14 has occurred, thereby requiring generation of a transmittal image 62. A variety of methods may be used to evaluate detection images 60 to determine whether changes between compared detection images 60 require generation of a transmittal image 62. In the illustrated embodiment, variation criteria 52 comprises pixel characteristics 64 and contrast characteristics 66. Pixel characteristics 64 comprise comparison information of detection images 60 based on the pixels contained within the detection image 60. For example, pixel characteristics 64 may be based on a color designation assigned to each pixel of detection images 60 such that if variations in quantity or color designations associated with the pixels of detection images 60 exceed a predetermined level, generation of a transmittal image 62 is required. Contrast characteristics 66 comprises information associated with contrast differences between compared detection images 60 to determine whether a transmittal image 62 is required. For example, detection images 60 may be compared to determine whether a contrast value corresponding to various portions of each detection image 60 exceeds a predetermined level, thereby requiring generation of a transmittal image 62.

In operation, monitor application 40 evaluates detection images 60 to determine whether variations between two detection images 60 exceeds a predetermined level, thereby requiring generation of a transmittal image 62. For example, imaging device 16 may be adapted to generate detection images 60 at a predetermined interval and store detection images 60 in database 44. Monitor application 40 may compare detection images 60 using variation criteria 52 to determine whether variations to detection images 60 indicate a sufficient change to document 14, thereby requiring generation of a transmittal image 62. Monitor application 40 may be adapted to compare successive detection images 60 or compare non-successive detection images 60 using variation criteria 52. For example, monitor application 40 may be adapted to use a single detection image 60 as a baseline for comparing a series of successive detection images until differences between one of the successive detection images 60 and the baseline detection image 60 exceed the predetermined variation criteria 52. Alternatively, monitor application 40 may be adapted to compare pairs of successive detection images 60 until differences between the pair of successive detection images 60 exceed the predetermined variation criteria 52.

After variations between compared detection images 60 exceed a predetermined level associated with variation criteria 52, lighting application 42 activates strobe light source 18 to direct light toward document 14 for generation of a high resolution image of document 14. Additionally, lighting application 42 synchronizes activation of imaging device 16 corresponding to activation of strobe light source 18 for generating the high resolution image of document 14. As described above, variation criteria 52 may also comprise frequency data 68 having information associated with the frequency of generated high resolution images of document 14. Thus, for example, monitor application 40 also determines whether a frequency of generated high resolution images exceeds a predetermined level corresponding to frequency data 68. If the frequency of high resolution images exceeds the predetermined frequency data 68, lighting application 42 activates constant light source 20 to provide a generally constant light directed toward document 14 such that imaging device 16 may generate a series of high resolution images corresponding to document 14. Alternatively, as described above, if ambient light is insufficient to generate detection images 60 of sufficient resolution and a relatively low intensity of light is generated by constant light source(s) 20 for generating detection images 60, lighting application 42 may increase the intensity level of the light generated by constant light source(s) 20 in response to exceeding a predetermined frequency of high resolution images.

Lighting application 42 also monitors and controls the intensity of light generated by constant light source(s) 20 such that as constant light source(s) 20 reaches a desired intensity, lighting application 42 may cease or terminate additional activation of strobe light source(s) 18. Thus, if constant light source(s) 20 are used to generate low resolution detection images 60, system 10 may be adapted to continue strobe light source 18 activation for generation of high resolution transmittal images 62 of document 14 until constant light source(s) 20 reach a desired intensity, at which time constant light source(s) 20 may be used to generate high resolution transmittal images 62. Correspondingly, as the frequency of generation of high resolution transmittal images 62 decreases to below the predetermined level associated with frequency data 68, lighting application 42 may deactivate or decrease the intensity level of constant light source(s) 20 and initiate activation of strobe light source(s) 18 for a next high resolution transmittal image 62. System 10 may also be configured such that when strobe light source(s) 18 are activated, constant light source(s) 20 are deactivated, and vice versa.

Additionally, system 10 may transmit data to remote site 26 using a variety of methods. For example, system 10 may be adapted to transmit images 62 to remote site 26 as images 62 are generated. Thus, if changes to document 14 are infrequent, a quantity of data transmitted to remote site 26 is minimized. Alternatively, system 10 may be adapted to repeatedly transmit the same image 62 to remote site 26 until another image 62 indicating a change to document 14 has been generated, at which time the new image 62 may be repeatedly transmitted to remote site 26.

Figure 3A:
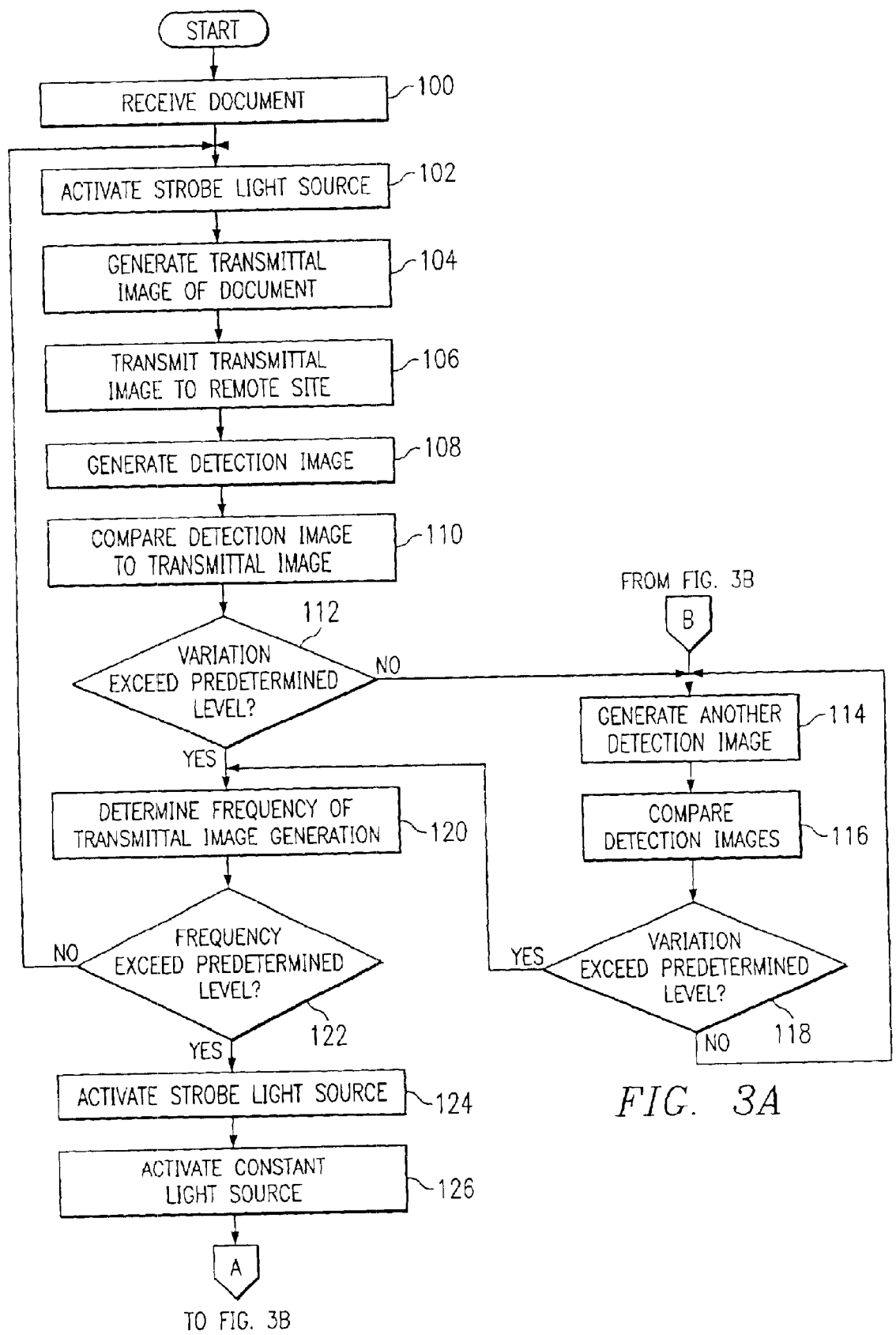

FIGS. 3A and 3B are a flowchart illustrating a method for dataconferencing in accordance with an embodiment of the present invention. The method begins at step 100, where system 10 receives a document 14 for use in dataconferencing. At step 102, lighting application 42 activates strobe light source 18. At step 104, imaging device 16 generates a transmittal image 62 of document 14 during activation of strobe light source 18. At step 106, the generated transmittal image 62 is communicated to remote site 26 via communication network 28.

At step 108, imaging device 16 generates a detection image 60 corresponding to document 14. As described above, detection images 60 may be generated using ambient light or lighting application 42 may activate constant light source 20 at a relatively low intensity for the generation of detection images 60. At step 110, monitor application 40 compares the transmittal image 62 generated at step 104 with the detection image 60 generated at step 108. At decisional step 112, monitor application 40 determines whether variations between the transmittal image 62 and the detection image 60 exceed variation criteria 52. If the variations between the transmittal image 62 and the detection image 60 do not exceed variation criteria 52, the method proceeds from step 112 to step 114, where imaging device 16 generates another detection image 60. At step 116, monitor application 40 compares the generated detection images 60 using variation criteria 52. At decisional step 118, a determination is made whether variations between the compared detection images 60 exceed variation criteria 52. If the variation between compared detection images 60 does not exceed a predetermined level associated with variation criteria 52, the method returns to step 114. If the variation between compared detection images 60 does exceed a predetermined level associated with variation criteria 52, the method proceeds from step 118 to step 120. Additionally, at decisional step 112, if the variation between the transmittal image 62 generated at step 104 and the detection image 60 generated at step 108 does exceed a predetermined level associated with variation criteria 52, the method proceeds from step 112 to step 120.

At step 120, monitor application 40 determines a frequency associated with generation of transmittal images 62. If the frequency of transmittal image 62 generation does not exceed a predetermined level associated with frequency data 68, the method returns to step 102. If the frequency of transmittal image 62 generation exceeds a predetermined level associated with frequency data 68, the method proceeds from step 122 to step 124, where lighting application 42 activates strobe light source 18. At step 126, lighting application 42 also activates constant light source 20. For example, the intensity level of constant light source 20 may be adjustable such that the intensity level may be increased until reaching a sufficient level to produce high resolution images, or constant light source 20 may require time to warm up before reaching a sufficient intensity level. At step 128, imaging device 16 generates a transmittal image 62 associated with document 14. At step 130, the generated transmittal image 62 is transmitted to remote site 26 via communication network 28.

At step 132, monitor application 40 generates a detection image 60 using imaging device 16. At step 134, monitor application 40 compares the transmittal image 62 generated at step 130 with the detection image 60 generated at step 132. At decisional step 136, monitor application 40 determines whether a variation between the transmittal image 62 generated at step 130 and the detection image 60 generated at step 132 exceeds a predetermined level associated with variation criteria 52. If the variation exceeds the predetermined level, the method proceeds from step 136 to step 138, where monitor application 40 determines a frequency of transmittal image generation. If the frequency associated with transmittal image 62 generation exceeds a predetermined level associated with frequency data 68, the method proceeds from step 140 to step 142, where lighting application 42 determines an intensity of constant light source 20. At decisional step 144, lighting application 42 determines whether the intensity of constant light source 20 corresponds to a predetermined level for generating high resolution images of document 14. If the intensity of constant light source 20 is at the required level, the method returns to step 128. If the intensity of constant light source 20 is not at the desired level, the method proceeds from step 144 to step 146, where lighting application 42 activates strobe light source 18 for generation of the high resolution image.

At decisional step 136, if the variation between the transmittal image generated at step 130 and the detection image generated at step 132 does not exceed a predetermined level associated with variation criteria 52, the method proceeds from step 136 to step 148, where lighting application 42 deactivates constant light source 20. Additionally, at decisional step 140, if the frequency of transmittal image 62 generation does not exceed a predetermined level associated with frequency data 68, the method proceeds from step 140 to step 148. At decisional step 150, a determination is made whether additional images of document 14 are required for dataconferencing. If additional images are required, the method returns to step 114. If no additional images are required, the method ends.

What is claimed is:

1. A dataconferencing system, comprising:
   an imaging device adapted to generate an image of a document;
   a light source adapted to generate light proximate to the document for generating the image;
   a monitor application accessible by a processor and adapted to detect a change corresponding to the document; and
   a lighting application accessible by the processor and adapted to automatically activate the light source in response to the detected change.

2. The system of claim 1, wherein the lighting application is adapted to synchronize activation of the imaging device with activation of the light source.

3. The system of claim 1, wherein the monitor application is adapted to control a frequency of activation of the light source.

4. The system of claim 1, wherein the light source comprises a strobe light source.

5. The system of claim 1, wherein the monitor application is adapted to detect the change to the document using ambient light.

6. The system of claim 1, further comprising a detector coupled to the processor and adapted to detect motion proximate to the document.

7. The system of claim 6, wherein the lighting application is adapted to activate the light source in response to detected motion.

8. The system of claim 1, further comprising a constant light source adapted to provide a substantially constant light proximate to the document for generating the image.

9. The system of claim 8, wherein the lighting application is adapted to activate the constant light source in response to exceeding a predetermined frequency of change corresponding to the document.

10. The system of claim 8, wherein the constant light source comprises a variable intensity constant light source.

11. A dataconferencing method, comprising:
    receiving a document;
    detecting a change to the document;
    automatically activating a light source to generate light proximate to the document in response to the detected change; and
    generating an image of the document using the generated light.

12. The method of claim 11, further comprising transmitting the image to a remote site.

13. The method of claim 11, wherein activating a light source comprises activating a strobe light.

14. The method of claim 11, wherein activating a light source further comprises controlling a frequency of activation of the light source.

15. The method of claim 11, further comprising detecting motion proximate to the document.

16. The method of claim 15, wherein activating the light source further comprises activating the light source in response to the detected motion.

17. The method of claim 11, wherein detecting a change comprises detecting a frequency of change.

18. The method of claim 17, further comprising activating a constant light source to generate a substantially constant light proximate to the document in response to the frequency of change.

19. The method of claim 11, wherein detecting a change comprises detecting a change to the document using ambient light.

20. The method of claim 11, further comprising synchronizing activation of the light source with the image generation.

21. An improved imaging device, comprising:
a database comprising a plurality of images of a document;
a monitor application accessible by a processor and adapted to compare at least two of the plurality of images;
a lighting application accessible by the processor and adapted to automatically activate a light source to direct light toward the document if differences between the at least two compared images exceed a variation criterion; and
an imaging device adapted to generate another image of the document during activation of the light source.

22. The device of claim 21, wherein the light source comprises a strobe light.

23. The device of claim 22, wherein the monitor application is further adapted to control a frequency of light source activation.

24. The device of claim 21, further comprising a detector adapted to detect motion proximate to the document.

25. The device of claim 24, wherein the monitor application is further adapted to automatically activate the light source in response to the detected motion.

26. The device of claim 21, wherein the lighting application is further adapted to activate a constant light source to generate a substantially constant light toward the document if the differences exceed a predetermined frequency.

27. The device of claim 26, wherein the constant light source comprises a variable intensity constant light source.

28. A dataconferencing system, comprising:
means for receiving a document;
means for detecting a change corresponding to the document;
means for automatically activating a light source to direct light toward the document in response to the detected change; and
means for generating an image of the document using the light.

29. The system of claim 28, further comprising means for detecting motion proximate to the document.

30. The system of claim 29, wherein the means for activating comprises means for automatically activating the light source in response to the detected motion.

31. The system of claim 28, wherein the light source comprises a strobe light.

32. The system of claim 28, further comprising means for transmitting the image to a remote site.

33. The system of claim 28, further comprising means for generating a substantially constant light directed toward the document.

34. The system of claim 28, wherein the means for detecting comprises means for detecting pixel characteristic variations between at least two images of the document.

35. The system of claim 28, wherein the means for detecting comprises means for detecting contrast variations between at least two images of the document.

36. An improved imaging device, comprising:
a light source adapted to generate light proximate to a document;
an imaging device adapted to generate an image of the document using the light generated by the light source;
a detector adapted to detect movement proximate to the document; and
a lighting application accessible by a processor and adapted to automatically activate the light source in response to the detected movement.

37. The device of claim 36, wherein the light source comprises a strobe light.

38. The device of claim 36, further comprising a constant light source adapted to generate a substantially constant light proximate to the document in response to exceeding a predetermined frequency of detected movement.

39. The device of claim 38, wherein the constant light source comprises a variable intensity constant light source.

40. The device of claim 36, wherein the lighting application is adapted to control a frequency of activation of the light source.

41. A dataconferencing system, comprising:
a monitor application accessible by a processor and adapted to compare at least two detection images of a document;
a lighting application accessible by the processor and adapted to automatically activate a light source to direct light toward the document if differences between the compared detection images exceed a variation criterion; and
an imaging device adapted to generate a transmittal image of the document using the light generated by the light source to a remote site, the transmittal image transmitted to a remote site.

42. The system of claim 41, further comprising a constant light source adapted to provide a substantially constant light proximate to the document for generating the transmittal image.

43. The system of claim 42, wherein the lighting application is adapted to activate the constant light source in response to exceeding a predetermined frequency of transmittal image generation.

44. The system of claim 42, wherein the constant light source comprises a variable intensity constant light source.

45. The system of claim 41, wherein the light source comprises a strobe light.

46. The system of claim 41, wherein the lighting application is adapted to control a frequency of light source activation.

* * * * *

UNITED STATES PATENT AND TRADEMARK OFFICE
CERTIFICATE OF CORRECTION

PATENT NO. : 6,878,924 B2
APPLICATION NO. : 10/162150
DATED : April 12, 2005
INVENTOR(S) : John M. Baron It is certified that error appears in the above-identified patent and that said Letters Patent is hereby corrected as shown below:

In column 1, line 50, after "generate" insert -- light --.

Signed and Sealed this

Nineteenth Day of May, 2009

JOHN DOLL
*Acting Director of the United States Patent and Trademark Office*